United States Patent
Jou et al.

(10) Patent No.: US 6,285,996 B1
(45) Date of Patent: Sep. 4, 2001

(54) RUN-TIME SUPPORT FOR USER-DEFINED INDEX RANGES AND INDEX FILTERS

(75) Inventors: Michelle Mei-Chiou Jou, San Jose; Daniel Tsunfang Lee, Fremont; Ping Li, San Jose; Hsin Pan, San Jose; Brian Thinh-Vinh Tran, San Jose; Yun Wang, Saratoga, all of CA (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/113,802

(22) Filed: Jul. 9, 1998

Related U.S. Application Data

(60) Provisional application No. 60/052,180, filed on Jul. 10, 1997.

(51) Int. Cl.[7] ................................................. G06F 17/30
(52) U.S. Cl. ............................ 707/4; 707/1; 707/2; 707/3
(58) Field of Search .................................... 707/103, 104, 707/2, 1, 3, 4

(56) References Cited

U.S. PATENT DOCUMENTS

| | | | |
|---|---|---|---|
| 4,531,186 | 7/1985 | Knapman | 707/5 |
| 4,841,433 | 6/1989 | Hakim et al. | 707/3 |
| 5,043,872 | * 8/1991 | Cheng et al. | 707/2 |
| 5,299,123 | * 3/1994 | Wang et al. | 707/2 |
| 5,327,543 | 7/1994 | Miura et al. | 712/224 |
| 5,404,510 | 4/1995 | Smith et al. | 707/2 |
| 5,454,039 | 9/1995 | Coppersmith et al. | 380/28 |
| 5,544,357 | 8/1996 | Huei | 707/2 |
| 5,546,576 | 8/1996 | Cochrane et al. | 707/2 |
| 5,553,281 | 9/1996 | Brown et al. | 707/104 |
| 5,590,325 | * 12/1996 | Kolton et al. | 707/104 |
| 5,604,892 | 2/1997 | Nuttall et al. | 703/18 |
| 5,608,904 | 3/1997 | Chaudhuri et al. | 707/2 |

(List continued on next page.)

FOREIGN PATENT DOCUMENTS 0 650 131 A1   4/1995   (EP) .

OTHER PUBLICATIONS

"Heirarchical Data Model for a Relational Database based Geographic Information System", *IBM® Technical Disclosure Bulletin*, 40(03):107–116 (Mar. 1997).

Lynch, C. et al., "Extended User—Defined Indexing with Application to Textual Database", *Proceedings of the 14th VLDB Conference*, pp. 306–317 (1988).

Rudolf Bayer, "The Universal B—Tree for Multidimensional Indeting: General Concepts", Worldwide Computing and its Applications, International Conference, WWCA '97, Tsukuba, Japan, (Mar. 1997).

Faloutsos, C. et al., "Fast Map: A Fast Algorithm for Indexing, Data—Mining and Visualization of Traditional and Multimedia Datasets", Proc. of ACM SIGMOD, pp. 163–174 (May 1995).

Ouksel, M. et al., "Multidmensional B—trees: Analysis of Dynamic Behavior", Dept. of Elec. Eng. and Computer Science, Northwestern Univ., Evanston, III., BIT 21, pp. 401–418 (1981).

Klaus, F. et al., "Flexible, Runtime Efficient Fector—Radix Algorithms For Multidimensional Fast Fourier Transform", SPIE, vol. 2247, Sensors and Control for Automation, pp. 216–226 (1994).

(List continued on next page.)

Primary Examiner—Jack Choules
Assistant Examiner—Cheryl Lewis
(74) Attorney, Agent, or Firm—Sughrue, Mion, Zinn, Macpeak & Seas, PLLC

(57) ABSTRACT

A method, apparatus, and article of manufacture for run-time support for user-defined index ranges and index filters. A statement is executed in a database stored on a data storage device, which is connected to a computer. The database contains data. A search range is generated based on a user-defined range function associated with a user-defined index.

31 Claims, 6 Drawing Sheets

U.S. PATENT DOCUMENTS

| | | | |
|---|---|---|---|
| 5,619,692 | | 4/1997 | Malkemus et al. ...................... 707/2 |
| 5,630,125 | * | 5/1997 | Zellweger ............................. 707/103 |
| 5,630,127 | | 5/1997 | Moore et al. ......................... 707/104 |
| 5,778,354 | * | 7/1998 | Leslie et al. ............................ 707/2 |
| 5,802,518 | * | 9/1998 | Karaev et al. ............................ 707/9 |

OTHER PUBLICATIONS

Sang, K.S. et al., "Applicability of genetic algorithms to optimal evaluation of path predicates in object–oriented queries", Information Processing Letters, vol. 58, No. 3, pp. 123–128 (abstract), (May 1996).

Byungwook, K. et al., "A new indexing scheme supporting multi–attribute database applications: MAX", Journal of Systems Architecture, vol. 42, No. 2, pp. 144–162 (abstract), (Sep. 1996).

Silberschatz, A. et al., "Managing Class Types", SPI Database of Software Technologies, 6 pages, (May 1977).

Scheuermann, P. et al., "Multidimensional B—Trees For Associative Searching In Database Systems", Inform. Systems, vol. 7, No. 2, pp. 123–137 (1982).

* cited by examiner

RUN-TIME SUPPORT FOR USER-DEFINED INDEX RANGES AND INDEX FILTERS

PROVISIONAL APPLICATION

This application claims the benefit of U.S. Provisional Application No. 60/052,180, entitled "User Defined Search in Relational Database Management Systems," filed on Jul. 10, 1997, by Gene Y. C. Fuh et al., which is incorporated by reference herein.

CROSS-REFERENCE TO RELATED APPLICATIONS

This application is related to the following copending and commonly-assigned patent applications:

Application Ser. No. 09/113,976, entitled "User-Defined Search in Relational Database Management Systems," filed on same date herewith, by Gene Y. C. Fuh, et al., pending;

Application Ser. No. 09/112,723, entitled "Supporting Database Indexes Based on a Generalized B-Tree Index," filed on same date herewith, by Stefan Dessloch, et al., pending;

Application Ser. No. 09/112,301, entitled "Multiple-Stage Evaluation of User-Defined Predicates," filed on same date herewith, by Gene Y. C. Fuh, U.S. Pat. No. 6,192,358;

Application Ser. No. 09/112,307, entitled "A Generalized Model for the Exploitation of Database Indexes," filed on same date herewith, by Gene Y. C. Fuh, et al., pending;

Application Ser. No. 09/112,302, entitled "A Fully Integrated Architecture For User-Defined Search," filed on same date herewith, by Gene Y. C. Fuh, et al., pending;

Application Ser. No. 08/786,605, entitled "A Database Management System, Method and Program for Supporting the Mutation of a Composite Object Without Read/Write and Write/Write Conflicts," filed on Jan. 21, 1997, by Linda G. DeMichiel, et al., U.S. Pat. No. 5,857,182; and Application Ser. No. 08/914,394, entitled "An Optimal Storage Mechanism for Persistent Objects in DBMS," filed on Aug. 19, 1997, by Gene Y. C. Fuh, et al., U.S. Pat. No. 6,065,013;

all of which are incorporated by reference herein.

BACKGROUND OF THE INVENTION

1. Field of the Invention

This invention relates in general to computer-implemented database systems, and, in particular, to run-time support for user-defined index ranges and index filters.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples or records. A database will typically have many tables and each table will typically have multiple tuples and multiple columns. The tables are typically stored on direct access storage devices (DASD), such as magnetic or optical disk drives for semi-permanent storage.

Many traditional business transaction are processed using a RDBMS. Since the inclusion of RDBMSs in business, user-defined data types and user-defined functions have been brought into RDBMSs to enrich the data modeling and data processing power. User-defined data based on the user-defined data types may include audio, video, image, text, spatial data (e.g., shape, point, line, polygon, etc.), time series data, OLE documents, Java objects, C++ objects, etc.

A table in a database can be accessed using an index. An index is an ordered set of references (e.g., pointers) to the records or rows in a database file or table. The index is used to access each record in the file using a key (i.e., one of the fields of the record or attributes of the row). Without an index, finding a record would require a scan (e.g., linearly) of an entire table. Indexes provide an alternate technique to accessing data in a table. Users can create indexes on a table after the table is built. An index is based on one or more columns of the table.

When a table contains user-defined data, conventional systems typically do not provide adequate support for user-defined index ranges and index filters. Therefore, there is a need in the art for run-time support for user-defined index ranges and index filters for data.

SUMMARY OF THE INVENTION

To overcome the limitations in the prior art described above, and to overcome other limitations that will become apparent upon reading and understanding the present specification, the present invention discloses a method, apparatus, and article of manufacture for computer-implemented run-time support for user-defined index ranges and index filters.

In accordance with the present invention, a statement is executed in a database stored on a data storage device, which is connected to a computer. The database contains data. A search range is generated based on a user-defined range function associated with a user-defined index.

An object of the invention is to enable users to provide user-defined range functions for generating search ranges. Another object of the invention is to enable users to provide user-defined index filters to filter data.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment. reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
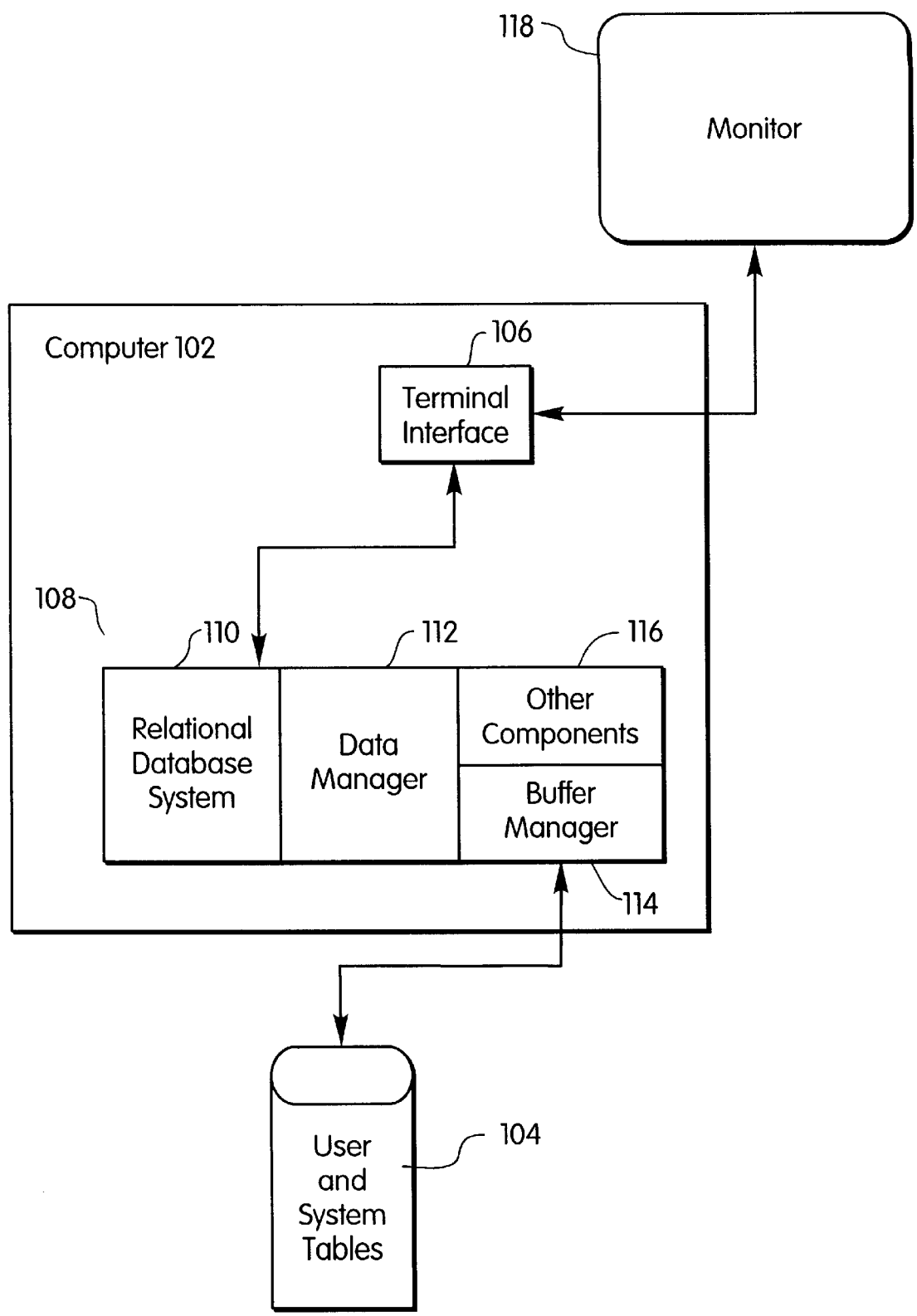
FIG. 1 illustrates an exemplary computer hardware environment that could be used in accordance with the present invention.

FIG. 1 illustrates an exemplary computer hardware environment that could be used in accordance with the present invention. In the exemplary environment, a computer system 102 is comprised of one or more processors connected to one or more data storage devices 104, such as a fixed or hard disk drive, a floppy disk drive, a CDROM drive, a tape drive, or other device, that store one or more relational databases.

Operators of the computer system 102 use a standard operator interface 106, such as IMS/DB/DC®, CICS®, TSO®, OS/390®, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB2® product offered by IBM for the AIX® operating system. Those skilled in the art will recognize, however, that the present invention has application to any RDBMS software, whether or not the RDBMS software uses SQL.

At the center of the DB2® system is the Database Services module 108. The Database Services module 108 contains several submodules, including the Relational Database System (RDS) 110, the Data Manager 112, the Buffer Manager I 14, and other components 116 such as an SQL compiler/interpreter. These submodules support the functions of the SQL language, i.e. definition, access control, interpretation, compilation, database retrieval, and update of user and system data.

The present invention is generally implemented using SQL statements executed under the control of the Database Services module 108. The Database Services module 108 retrieves or receives the SQL statements, wherein the SQL statements are generally stored in a text file on the data storage devices 104 or are interactively entered into the computer system 102 by an operator sitting at a monitor 118 via operator interface 106. The Database Services module 108 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage devices 104 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Figure 2:
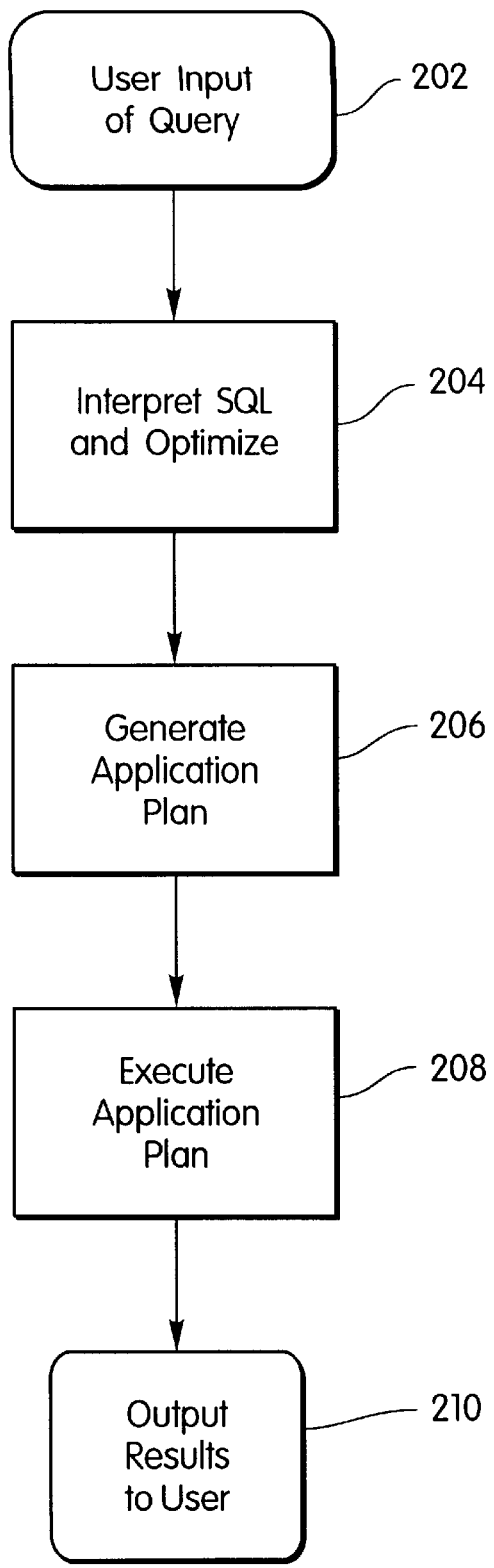
FIG. 2 is a flowchart illustrating the steps necessary for the interpretation and execution of SQL statements in an interactive environment according to the present invention.

FIG. 2 is a flowchart illustrating the steps necessary for the interpretation and execution of SQL statements in an interactive environment according to the present invention. Block 202 represents the input of SQL statements into the computer system 102 from the user. Block 204 represents the step of compiling or interpreting the SQL statements. An optimization function within block 204 may optimize the SQL. Block 206 represents the step of generating a compiled set of run-time structures called an application plan from the compiled SQL statements. Generally, the SQL statements received as input from the user specify only the data that the user wants, but not how to get to it. This step considers both the available access paths (indexes, sequential reads, etc.) and system held statistics on the data to be accessed (the size of the table, the number of distinct values in a particular column, etc.), to choose what it considers to be the most efficient access path for the query. Block 208 represents the execution of the application plan, and block 210 represents the output of the results of the application plan to the user.

Figure 3:
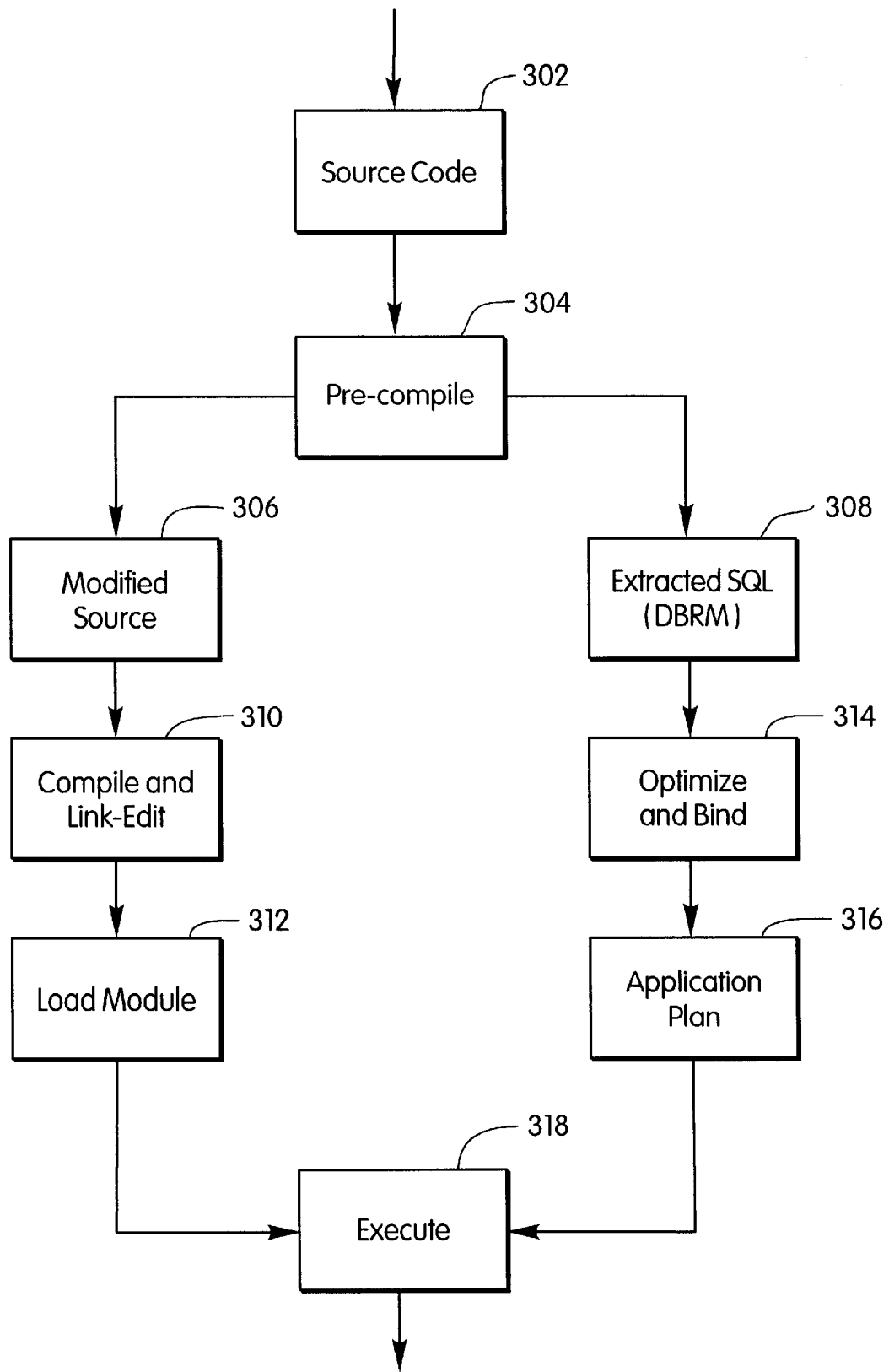
FIG. 3 is a flowchart illustrating the steps necessary for the interpretation and execution of SQL statements embedded in source code according to the present invention.

FIG. 3 is a flowchart illustrating the steps necessary for the interpretation and execution of SQL statements embedded in source code according to the present invention. Block 302 represents program source code containing a host language (such as COBOL or C) and embedded SQL statements. The program source code is then input to a pre-compile step 304. There are two outputs from the pre-compile step 304: a modified source module 306 and a Database Request Module (DBRM) 308. The modified source module 306 contains host language calls to DB2, which the pre-compile step 304 inserts in place of SQL statements. The DBRM 308 consists of the SQL statements from the program source code 302. A compile and link-edit step 310 uses the modified source module 306 to produce a load module 312, while an optimize and bind step 314 uses the DBRM 308 to produce a compiled set of run-time structures for the application plan 316. As indicated above in conjunction with FIG. 2, the SQL statements from the program source code 302 specify only the data that the user wants, but not how to get to it. The optimize and bind step 314 may reorder the SQL query in a manner described in more detail later in this specification. Thereafter, the optimize and bind step 314 considers both the available access paths (indexes, sequential reads, etc.) and system held statistics on the data to be accessed (the size of the table, the number of distinct values in a particular column, etc.), to choose what it considers to be the most efficient access path for the query. The load module 312 and application plan 316 are then executed together at step 318.

The Extended DBMS Architecture for User-Defined Search

Figure 4:
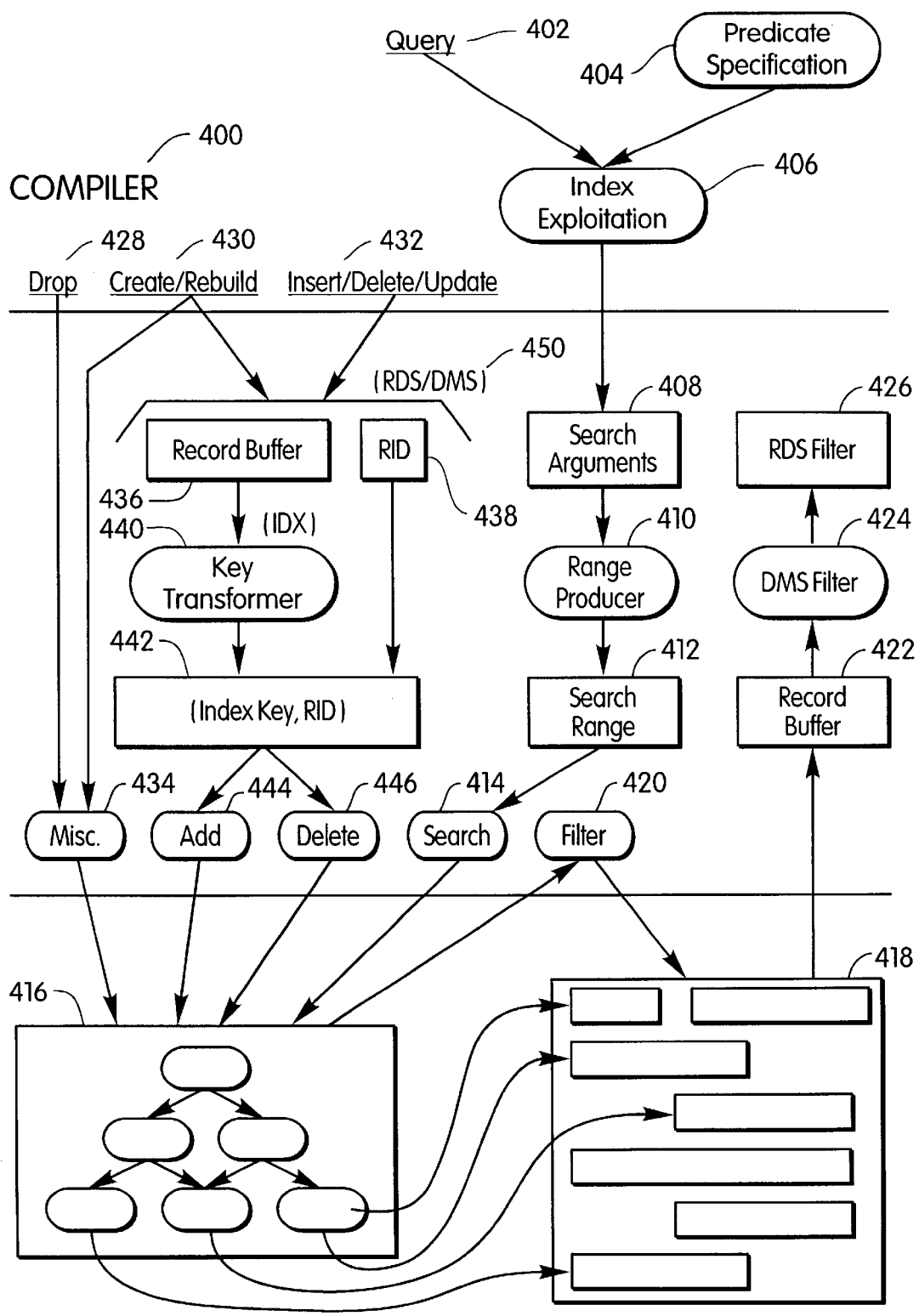
FIG. 4 illustrates a compiler of the present invention.

FIG. 4 illustrates a compiler 400 of the present invention, which performs steps 204 and 206, discussed above. The compiler 400 of the present invention contains the following "extended" modules: Predicate Specification 404 and Index Exploitation 406. The run-time 450 of the present invention contains the following "extended" modules: Range Producer 410, DMS Filter 424, RDS Filter 426, and Key Transformer 440. The "extended" modules have been modified to provide the capability for pushing user-defined types, index maintenance and index exploitation, and user-defined functions and predicates inside the database.

The Predicate Specification module 404 has been extended to handle user-defined predicates. The Index Exploitation module 406 has been modified to exploit user-defined indexes and provide more sophisticated pattern matching (e.g., recognizes "salary+bonus").

Additionally, the Predicate Specification module 404, the Index Exploitation module 406, and the DMS Filter module 424 work together to provide a technique to evaluate user-defined predicates using a three-stage technique. In the first stage an index is applied to retrieve a subset of records using the following modules: Search Arguments 408, Range Producer 410, Search Range 412, Search 414, and Filter 420. For the records retrieved, in the second stage, an approximation of the original predicate is evaluated by applying a user-defined "approximation" function to obtain a smaller subset of records, which occurs in the DMS Filter module 424. In the third stage, the predicate itself is evaluated to determine whether the smaller subset of records satisfies the original predicate.

The Range Producer module 410 has been extended to handle user-defined ranges, and, in particular, to determine ranges for predicates with user-defined functions and user-defined types. The DMS Filter module 424 and the RDS Filter module 426 have been extended to handle user-defined functions for filtering data.

To process a query 402, the compiler 400 receives the query 402. The query 402 and the predicate specification from the Predicate Specification module 404 are submitted to the Index Exploitation module 406. The Index Exploitation module 406 performs some processing to exploit indexes. At run-time, the Search Arguments module 408 evaluates the search argument that will be used by the Range Producer module 410 to produce search ranges. The Range Producer module 410 will generate search ranges based on user-defined functions. The Search Range module 412 will generate final search ranges. The Search module 414 will perform a search using the B-Tree 416 to obtain the record identifier (ID) for data stored in the table 418. The retrieved index key is submitted to the Filter module 420, which eliminates non-relevant records. Data is then fetched into the Record Buffer module 422 for storage. The DMS Filter module 424 and the RDS Filter module 426 perform final filtering.

The Key Transformer module 440 has been modified to enable users to provide user-defined functions for processing inputs to produce a set of index keys. The user-defined functions can be scalar functions or table functions. A scalar function generates multiple key parts to be concatenated into an index key. A table function generates multiple sets of key parts, each of which is to be concatenated into an index key. Additionally, the input to the Key Transformer module 440 can include multiple values (e.g., values from multiple columns or multiple attributes of a structured type), and the user-defined functions can produce one or more index keys.

The compiler 400 can process various statements, including a Drop 428, Create/Rebuild 430, or Insert/Delete/Update 432 statements. A Drop statement 428 may be handled by Miscellaneous modules 434 that work with the B-Tree 416 to drop data.

An Insert/Delete/Update statement 432 produce record data in the Record Buffer module 436 and the RID module 438. The data in the Record Buffer module 436 is submitted to the Key Transformer module 440, which identifies key sources in the records it receives. Key targets from the Key Transformer module 440 and record identifiers from the RID module 438 are used by the Index Key/RID module 442 to generate an index entry for the underlying record. Then, the information is passed to the appropriate module for processing, for example, an Add module 444 or a Delete module 446.

The compiler 400 will process a Create/Rebuild statement 430 in the manner of the processing a Drop statement 428 when data is not in the table or an Insert/Delete/Update statement 432 when data is in the table.

Run-time Support for User-Defined Index Ranges and Index Filters

The present invention focuses on user-defined search range generators and index filters. The present invention enables users to provide user-defined functions for generating index search ranges and filter index entries. The present invention evaluates user-defined search ranges and user-defined index filters at run-time. Thus, the technique of the present invention is transparent to the optimizer.

In a conventional system, an optimizer of a RDBMS generates a single search range based on predicates that do not contain user-defined index types or user-defined functions. The following is an example of a SQL statement without user-defined types or functions:

SELECT * FROM employee
   WHERE salary>:salary AND
     bonus<:bonus;

The above SELECT statement selects records from an "employee" table in which a "salary" field is greater than a ":salary" field and a "bonus" field is less than a ":bonus" field. In a conventional system, an optimizer would determine the start and stop keys for the range of records to be evaluated. During compile-time, the optimizer would prepare a search range using simple logic. Additionally, the conventional system would perform an index search and would filter index entries based on simple comparisons. Conventional systems are disadvantageous in that they provide a single search range. Moreover, conventional systems do not understand user-defined index ranges and filters. Furthermore, the search range and index filter are specified at compile-time, rather than at run-time.

Figure 5:
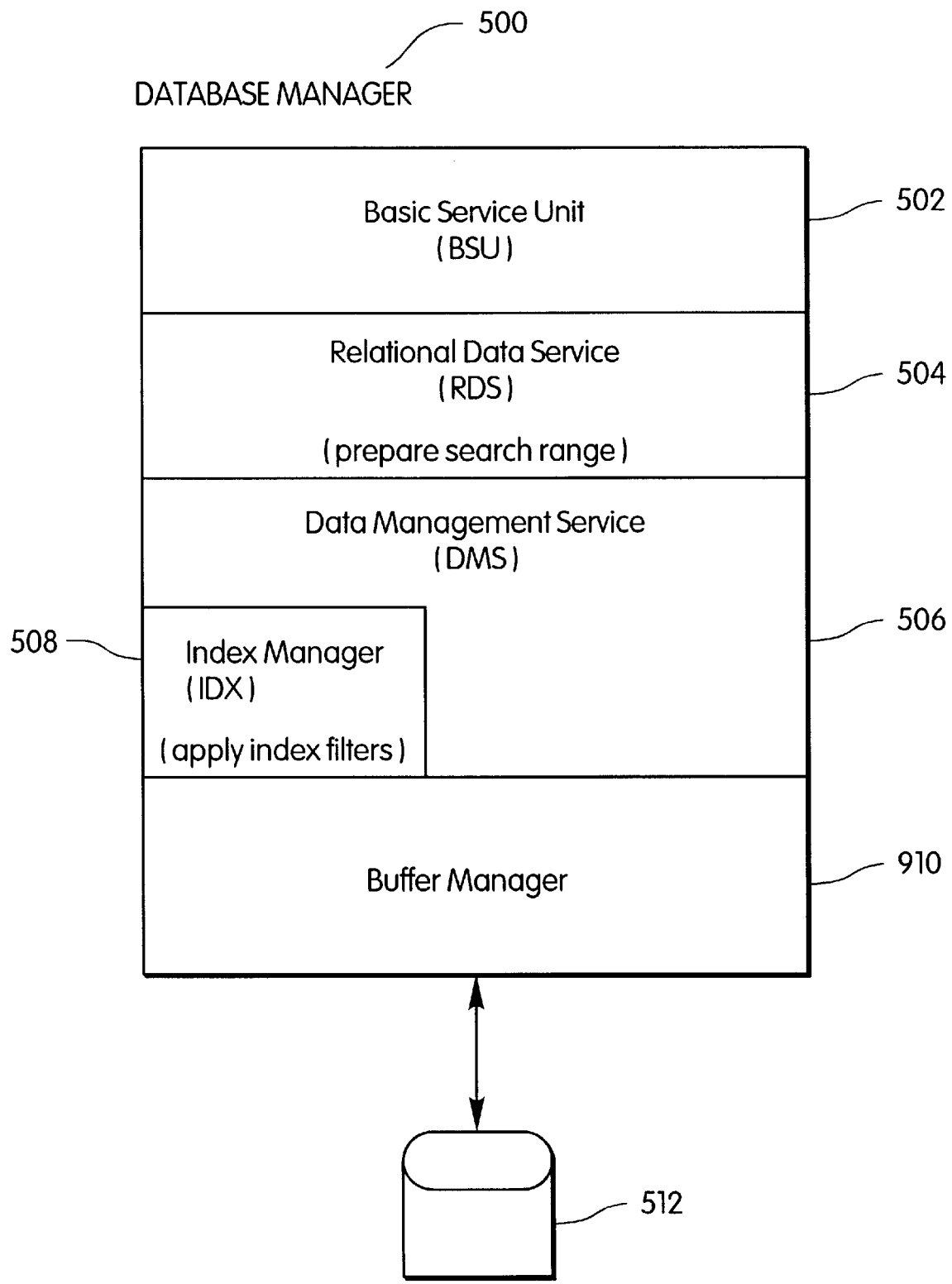
FIG. 5 is a block diagram illustrating a general architecture for a DB2 system.

FIG. 5 is a block diagram illustrating a general architecture for a DB2 system. One embodiment of the architecture of a Database Manager 500 is illustrated. A Basic Service Unit 502 provides basic services for the Database Manager 500. A Relational Data Service (RDS) 504 includes the Range Producer module 410, which generates a search range using a user-defined range function. A Data Management Service (DMS) 506 includes the Index Manager (IDX) 508. The Index Manager 508 includes the Filter module 420, which uses user-defined filter functions to filter index data. A Buffer Manager 510 stores data that is retrieved from a database 512 in a buffer pool. The database 512 is stored on a data storage device.

With run-time support of user-defined index ranges and index filters, for a SQL statement containing a predicate with a user-defined type or a user-defined function, the Range Producer 410 in the RDS 504 evaluates a user-defined range function associated with the index to generate a search range with a start key and a stop key identifying the range of records to be retrieved from the database 512. The RDS 504 passes the search range to the DMS 506. The DMS 506 fetches data by opening a table 418 and accessing the B-tree index 416 via the Search module 414. The B-tree index 416 is searched using the search range, and when a record is found, the record is passed to the Filter module 420. Then, the Filter module 420 in the Index Manager 508 applies a user-defined index filter to eliminate unqualified entries. Then, a record is retrieved from the database 512 and stored in the buffer pool in the Buffer Manager 510.

The following pseudocode illustrates the definition of user-defined search ranges and user-defined index filters:

```
CREATE INDEX EXTENSION spatial_index (gsize1
    double,
    gsize2 double,
    gsize3 double)
```

The above CREATE INDEX EXTENSION statement creates an index type called "spatial_index". Once an index type is defined, a user can define an index to be of the "spatial_index" type, and the index will have the characteristics of the defined index type. The "spatial_index" type has the following index keys:

```
WITH INDEX KEYS
    for (geo column Geometry)
    generated by generate_grid
        (geo column..xmin,
        geo_column..ymin,
        geo_column..xmax,
        geo_column..ymax,
        gsize1, gsize2, gsize3)
```

The index keys are generated by a user-defined function, called generate_grid. The following statements are used to define search techniques:

```
WITH SEARCH METHODS FOR INDEX KEYS
    (level int, gx integer, gy integer,
    xmin double, ymin double
    xmax double, ymax double)
WHEN within (search_geo Geometry)
    RANGE THROUGH generate_range
        (search_geo..xmin,
        search_geo..ymin,
        search_geo..xmax,
        search_geo..ymax,
        gsize1, gsize2, gsize3)
    CHECK WITH
        case when (search_geo..ymin>ymax) OR
            (search_geo..ymax<ymin)
        then 0
        else
        check_within (search_....xmin,
            search_geo..ymin,
            search_geo..xmax,
            search_geo..ymax,
            gsize1, gsize2, gsize3, level, gx, gy)
            xmin, ymin, xmax, ymax
    end
```

```
WITH SEARCH METHODS FOR INDEX KEYS
    (level int, gx integer, gy integer,
    xmin double, ymin double
    xmax double, ymax double)
WHEN within (search_geo Geometry)
    RANGE THROUGH generate_range
        (search_geo..xmin,
        search_geo..ymin,
        search_geo..xmax,
        search_geo..ymax,
        gsize1, gsize2, gsize3)
    CHECK WITH
        case when (search_geo..ymin>ymax) OR
            (search_geo..ymax<ymin)
        then 0
        else
        check_within (search_geo..xmin,
            search_geo..ymin,
            search_geo..xmax,
            search_geo..ymax,
            gzize1, gsize2, gsize3, level, gx, gy)
            xmin, ymin, xmax, ymax
    end
WHEN contains (search_geo Geometry)
```

The WHEN "within" statement indicates that a statement is to be evaluated with the search range specified by the RANGE THROUGH statement and using the index filter specified by the CHECK WITH statement when a user-defined function "within" is invoked in an SQL statement. The WHEN "contains" statement followed by ellipses indicates that another user-defined function is being defined.

In one embodiment of the present invention, the RANGE THROUGH statement is provided to enable a user to specify a user-defined range function (e.g., generate range) to generate a search range. The present invention provides the Range Producer module 410, which recognizes the RANGE THROUGH statement and is able to process a user-defined index type or a user-defined range function to generate a search range. In this manner, the present invention enables users to instruct the system to generate user-defined ranges. Users can plug in their own search-range generators by specifying user-defined range functions. Additionally, a user can generate multiple search ranges by providing a user-defined range function that generates multiple search ranges. Conventional systems are directed to data, such as salary data, for which a single search range is adequate (e.g., search for salaries between 20,000 and 50,000). However, structured data often requires multiple search ranges with different sets of start/stop keys. For example, spatial data usually requires multiple search ranges to search through different layers of different grid sizes (e.g., for spatial data representing a map, one level could contain customer sites and another level could contain counties within which the customer sites are located, and each search range could reference a different layer of the spatial data).

In one embodiment of the present invention, the CHECK WITH statement is provided to enable a user to specify a user-defined filter function (e.g., check_within) for index filtering. By enabling a user to specify user-defined index filters, the present invention allows users to write their own index-filter logic. There are multiple advantages to user-defined filters. First, user-defined filter functions remove unqualified tuples as early as possible from the data set to be retrieved. Second, for a particular record, there may be multiple entries in the B-tree index 416. Therefore, by filtering index entries using a user-defined filter function, a user can guarantee the uniqueness of a record identifier while the index manager is performing a search. The CHECK WITH statement is optional, and, if a user does not specify index filtering, then index filtering is not performed.

The following example illustrates a definition of a user-defined function:

```
CREATE FUNCTION within (g1 geometry, g2 geometry)
    returns integer
```

```
external name 'db2sefn!SDESpatialRelations'
language c
parameter style db2sql
not variant
not fenced
no sql
no external action
as predicate when=1
    filter by envelope_within (g1..xmin, g1..ymin
        g1..xmax, g1..ymax,
        g2..xmin, g2..ymin
        g2..xmax, g2..ymax)
    SEARCH BY INDEX EXTENSION spatial_index
        when key (g1) use within (g2)
        when key (g2) use contains (g1);
```

The CREATE FUNCTION statement creates a function, called "within". The SEARCH BY clause in the example above indicates that if a table has an index of the "spatial_index" type, then, depending on which argument of the "within" function is the key column, the system will use the appropriate RANGE THROUGH function and CHECK WITH function associated with the index exploitation rule identified by the "when" clause to generate search ranges and to filter index entries.

The following example illustrates a SQL statement using the user-defined function "within":

```
SELECT cid FROM customers c
    WHERE within (c.loc, circle(:x, :y, :r))=1;
```

The above SELECT statement selects the "cid" column from a customers table. For the above example, assume that the customer table has an index of the "spatial_index" type defined on the "cid" column. Since "c.loc" is the first argument of the "within" function, the system will use the user-defined function "generate_grid" to generate search ranges at run-time based on the value of the second argument, which is "circle(:x, :y, :r)" in this example. The system will also use the user-defined filter function to filter out unqualified entries during index search.

Referring to FIG. 5, the above SELECT statement would be processed with a search range being generated by the Range Producer 410 of the RDS 504. Then, the Index Manager 508 would search the B-tree index 416 to obtain an index to a record. Next, Filter 420 of the Index Manager 508 would apply an index filter to eliminate unqualified entries. Then, only the potential qualified rows would be fetched from a table 418 stored in the database 512. Finally, the system will apply the "within" function to further eliminate the unqualified rows before returning data in response to a query.

Figure 6:
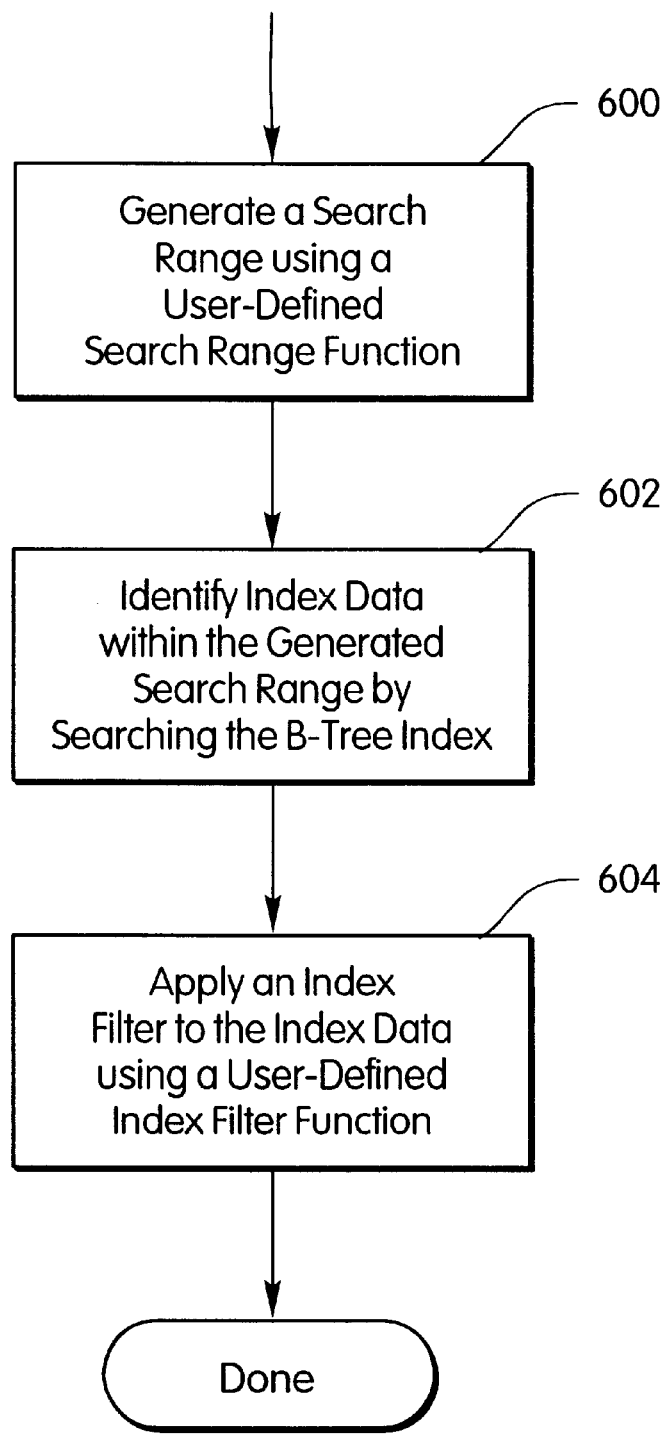
FIG. 6 is a flow diagram illustrating the steps performed by the present invention to provide run-time support for user-defined search ranges and index filters.

FIG. 6 is a flow diagram illustrating the steps performed by the present invention to provide run-time support for user-defined search ranges and index filters. In Block 600, the RDBMS generates a search range using the user-defined search range function. In Block 602, the RDBMS identifies index data within the generated search range by searching the B-tree index. In Block 604, the RDBMS applies an index filter to the index data using a user-defined index filter function.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for computer-implemented run-time support for user-defined index ranges and index filters. The present invention enables users to provide user-defined range functions for generating search ranges. Additionally, the present invention enables users to provide user-defined filter functions to filter data.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing a statement in a database stored on a data storage device connected to a computer, the database containing data, the method comprising the steps of:

at run-time, generating a search range based on a user-defined range function associated with a user-defined index and identifying index data within the generated search range.

2. The method of claim 1, wherein the step of generating a search range further comprises the step of generating multiple search ranges.

3. The method of claim 1, wherein the step of generating a search range is transparent in an access plan.

4. The method of claim 1, further comprising the step of filtering the user-defined index entries for the database based on a user-defined filter function.

5. The method of claim 4, wherein the user-defined filter function is associated with the user-defined index.

6. The method of claim 4, wherein the step of filtering the user-defined index entries is transparent in an access plan.

7. The method of claim 1, wherein the search range is generated by evaluating a search argument.

8. The method of claim 1, wherein index data is identified using a B-tree.

9. The method of claim 1, wherein the user-defined range function comprises a scalar function.

10. The method of claim 1, wherein the user-defined range function comprises a table function.

11. An apparatus for executing a statement, comprising:

a computer having a data storage device connected thereto, wherein the data storage device stores a database containing data; and one or more computer programs, performed by the computer, for, at run-time, generating a search range based on a user-defined range function associated with a user-defined index; and for identifying index data within the generated search range.

12. The apparatus of claim 11, wherein the means for generating a search range further comprises the means for generating multiple search ranges.

13. The apparatus of claim 11, wherein the means for generating a search range is transparent in an access plan.

14. The apparatus of claim 8, further comprising the means for filtering the user-defined index entries for the database based on a user-defined filter function.

15. The apparatus of claim 14, wherein the user-defined filter function is associated with the user-defined index.

16. The apparatus of claim 14, wherein the means for filtering the user-defined index entries is transparent in an access plan.

17. The apparatus of claim 8, wherein the search range is generated by evaluating a search argument.

18. The apparatus of claim 8, wherein index data is identified using a B-tree.

19. The apparatus of claim 8, wherein the user-defined range function comprises a scalar function.

20. The apparatus of claim 8, wherein the user-defined range function comprises a table function.

21. An article of manufacture comprising a computer program carrier readable by a computer and embodying one or more instructions executable by the computer to perform method steps for executing a statement in a database stored in a data storage device connected to the computer, wherein the database contains data, the method comprising the steps of:

at run-time, generating a search range based on a user-defined range function associated with a user-defined index; and identifying index data within the generated search range.

22. The article of manufacture of claim 21, wherein the step of generating a search range further comprises the step of generating multiple search ranges.

23. The article of manufacture of claim 21, wherein the step of generating a search range is transparent in an access plan.

24. The article of manufacture of claim 21, further comprising the step of filtering the user-defined index entries for the database based on a user-defined filter function.

25. The article of manufacture of claim 24, wherein the user-defined filter function is associated with the user-defined index.

26. The article of manufacture of claim 24, wherein the step of filtering the user-defined index entries is transparent in an access plan.

27. The article of manufacture of claim 21, wherein the search range is generated by evaluating a search argument.

28. The article of manufacture of claim 21, wherein index data is identified using a B-tree.

29. The article of manufacture of claim 21, wherein the user-defined range function comprises a scalar function.

30. The article of manufacture of claim 21, wherein the user-defined range function comprises a table function.

31. The article of manufacture of claim 21, wherein the index data comprises a record identifier for data stored in a table.

* * * * *